Figure 3:
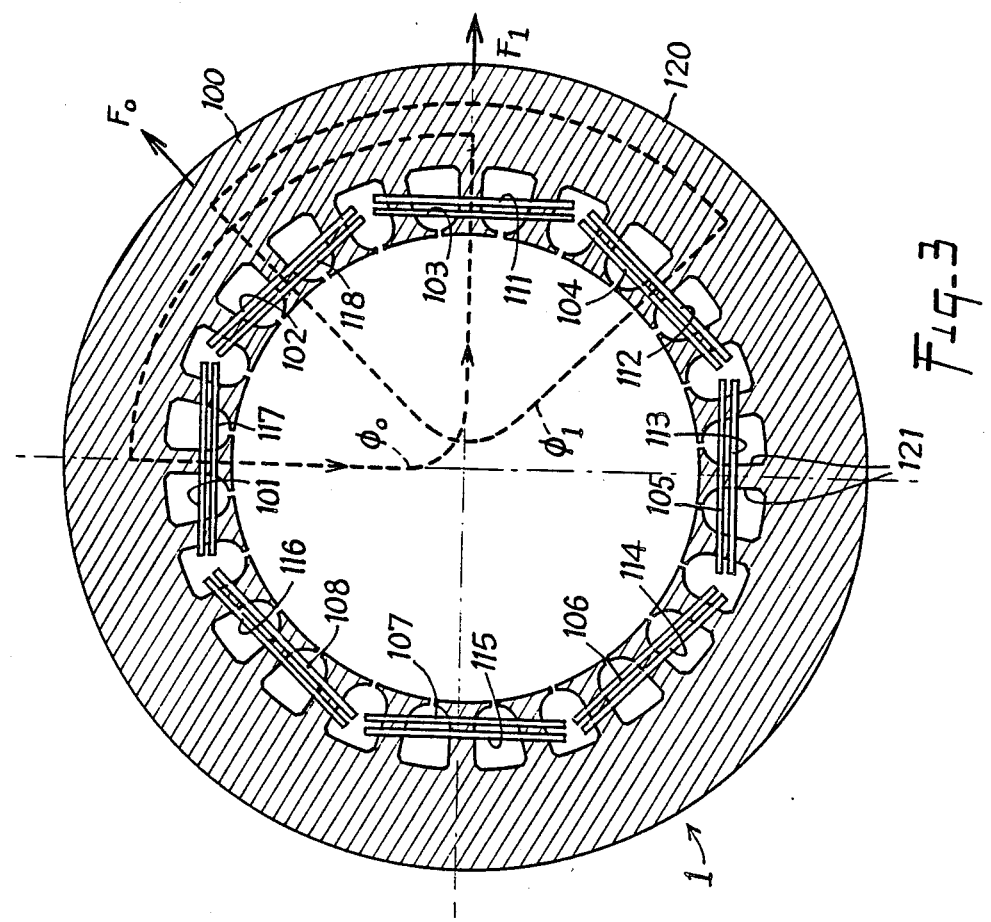

United States Patent [19]

Habermann et al.

[11] Patent Number: 4,866,318

[45] Date of Patent: Sep. 12, 1989

[54] ACTIVE RADIAL MAGNETIC BEARING WITH SOLID ROTOR FOR DAMPING CRITICAL FREQUENCIES

[75] Inventors: Helmut Habermann, Vernon; Maurice Brunet, Saint Marcel; Alain Gerbier, Gommecourt, all of France

[73] Assignee: Societe Anonyme styled: Societe Europeenne de Propulsion, Puteaux, France

[21] Appl. No.: 131,310

[22] Filed: Dec. 8, 1987

Related U.S. Application Data

[63] Continuation of Ser. No. 714,097, Mar. 20, 1985, abandoned.

[30] Foreign Application Priority Data

Mar. 26, 1984 [FR] France ............................ 84 04650

[51] Int. Cl.$^4$ ............................................ F16C 39/06
[52] U.S. Cl. .................................. 310/90.5; 324/207
[58] Field of Search ............... 310/90.5; 324/160, 207; 74/5.46, 5.47

[56] References Cited

U.S. PATENT DOCUMENTS

| | | | |
|---|---|---|---|
| 3,068,374 | 12/1962 | Bekey | 310/DIG. 6 |
| 3,702,208 | 11/1972 | Habermann | 308/10 |
| 3,860,300 | 1/1975 | Lyman | 310/90.5 |
| 4,128,795 | 12/1978 | Habermann | 308/10 UX |
| 4,245,869 | 1/1981 | Scheffer | 308/10 |
| 4,312,628 | 1/1982 | Yamamura | 310/90.5 |

FOREIGN PATENT DOCUMENTS

| | | | |
|---|---|---|---|
| 2177309 | 11/1973 | France | 308/10 |
| 2336603 | 7/1978 | France | 310/90.5 |
| 0109719 | 6/1983 | Japan | 308/10 |

OTHER PUBLICATIONS

"Physics"; Hausman & Slack; 1939; publ. D. Van Nostrand; New York, N.Y., pp. 484, 485.

Primary Examiner—R. Skudy
Attorney, Agent, or Firm—Weingarten, Schurgin, Gagnebin & Hayes

[57] ABSTRACT

Active radial magnetic bearing with solid rotor comprising a stator composed of an armature and electromagnetic coils, a rotor fast with a rotary shaft and placed opposite the stator, detectors for detecting the radial position of the rotor with respect to the stator, and servo-control circuits for adjusting the current going through the electromagnetic coils according to the value of the signals delivered by said position detectors.

The electromagnetic coils are so designed as to create a rotating sinusoidal magnetic field with radial flux, the electromagnetic coils comprising a plurality of windings distributed over the periphery of the stator and supplied in succession one after another from the servo-control circuits.

This type of bearing helps going through critical frequencies.

23 Claims, 4 Drawing Sheets

ACTIVE RADIAL MAGNETIC BEARING WITH SOLID ROTOR FOR DAMPING CRITICAL FREQUENCIES

This application is a continuation of application Ser. No. 714,097 filed Mar. 20, 1985, abandoned.

The present invention relates to an active radial magnetic bearing with solid rotor comprising a stator composed of an armature and electromagnetic coils, a rotor fast with a rotary shaft and placed opposite the stator, detectors for detecting the radial position of the rotor with respect to the stator, and servo-control circuits for adjusting the current going through the electromagnetic coils according to the value of the signals delivered by said position detectors.

It is known that for any rotating part, there are critical speeds at which the part gets out of shape by bending, the bent part exhibiting nodes and anti-nodes. It is therefore desirable to be able to go through such speeds with adequate damping.

French Pat. No. 2,336,603 discloses means for damping the critical frequencies of a rotor mounted on radial active magnetic bearings. Said device, which comprises means for selectively amplifying the gain of the servo-control circuit of the magnetic bearings, in phase or with a phase lead, inside a narrow frequency band centered on a frequency equal to the speed of rotation of the rotor, works satisfactorily. However, considering the high level required for the selective amplification, and therefore the increased value of the magnetic filed necessary to obtain an efficient damping when going through critical frequencies, the magnetic bearings must necessarily have an annular rotor armature made from a laminated ferromagnetic material. This is not readily feasible on all the rotating machines equipped with shafts of very large diameter, and it is virtually inapplicable to the existing machines without taking these entirely to pieces. Lamination is also often risky if speeds of rotation have to be very high.

Figure 1:
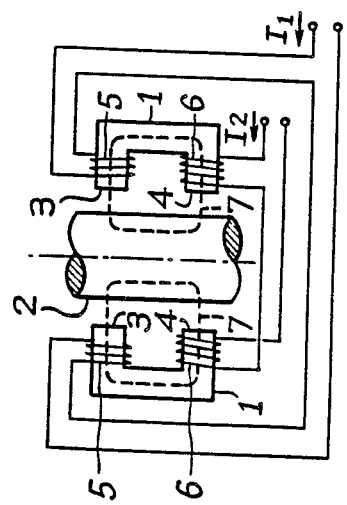

In order to eliminate the need of having to perform a lamination on the rotor, it is possible to use radial magnetic bearings with axial magnetic flux, of the type illustrated in FIG. 1, in which U-shaped electromagnets have poles situated on either side of a symmetry plane perpendicular to the rotor axis. In this case, a non-laminated rotor, either solid or tubular, may be used in order to obtain a damping when going through critical frequencies. This particular design presents nonetheless certain limitations insofar as the magnetic forces cannot be very high and the penetration of the magnetic flux into the rotor cannot be very deep. In addition, the rotor becomes overheated by the eddy currents, because the magnetic field which, in principle, turns synchronously with the rotor is not sinusoidal.

It is the object of the present invention to overcome the aforesaid disadvantages and to permit immediate and efficient damping of the disturbances appearing when going through critical frequencies, even for rotors of large diameter requiring magnetic bearings with high induction magnetic fields.

These objects are reached with an active radial magnetic bearing of the type described hereinabove, in which according to the invention, the rotor is solid, without lamination and the electromagnetic coils are so produced as to create a rotating sinusoidal magnetic field with radial flux, the electromagnetic coils comprising a plurality of windings distributed over the periphery of the stator and supplied in succession one after another from the servo-control circuits.

Due to these features, the rotor virtually sees no variations of the magnetic field over one revolution. Consequently, an efficient damping is achieved when going through critical frequencies without any particular overheating occurring from eddy currents.

More particularly, each of said windings supplied in succession comprises, mounted in series, a first coil supplied in a first direction and a second coil supplied in the opposite direction, said second coil being shifted angularly with respect to the first coil.

Each pair of coils constituting a winding is supplied from its own D.C. amplifier with a constant current flowing direction.

The coils of different windings are superposed.

More specifically, the first coil of one particular winding is superposed to the second coil of the penultimate winding supplied before the winding in question.

The first coil in every winding is inserted between the first and second coils of the winding supplied immediately before.

The coils of the electromagnetic windings are regularly distributed on the periphery of the stator.

Advantageously, all the coils are identical to one another and all the amplifiers are also identical to one another.

The magnetic bearing according to the invention comprises at least three windings, each one comprising a pair of coils and being supplied from its own amplifier.

According to one embodiment of the invention which appears to be very advantageous, the magnetic bearing comprises eight windings, each winding being comprised of one pair of coils supplied from its own amplifier.

In this case, the first and second coils of every winding are shifted by 90° with respect to one another.

According to another preferential embodiment of the invention, the magnetic bearing comprises ten windings, each winding comprising one pair of coils, supplied from its own amplifier.

The magnetic bearing according to the invention is thus particularly well adapted for being mounted on the end of a shaft of large diameter.

Figure 2:
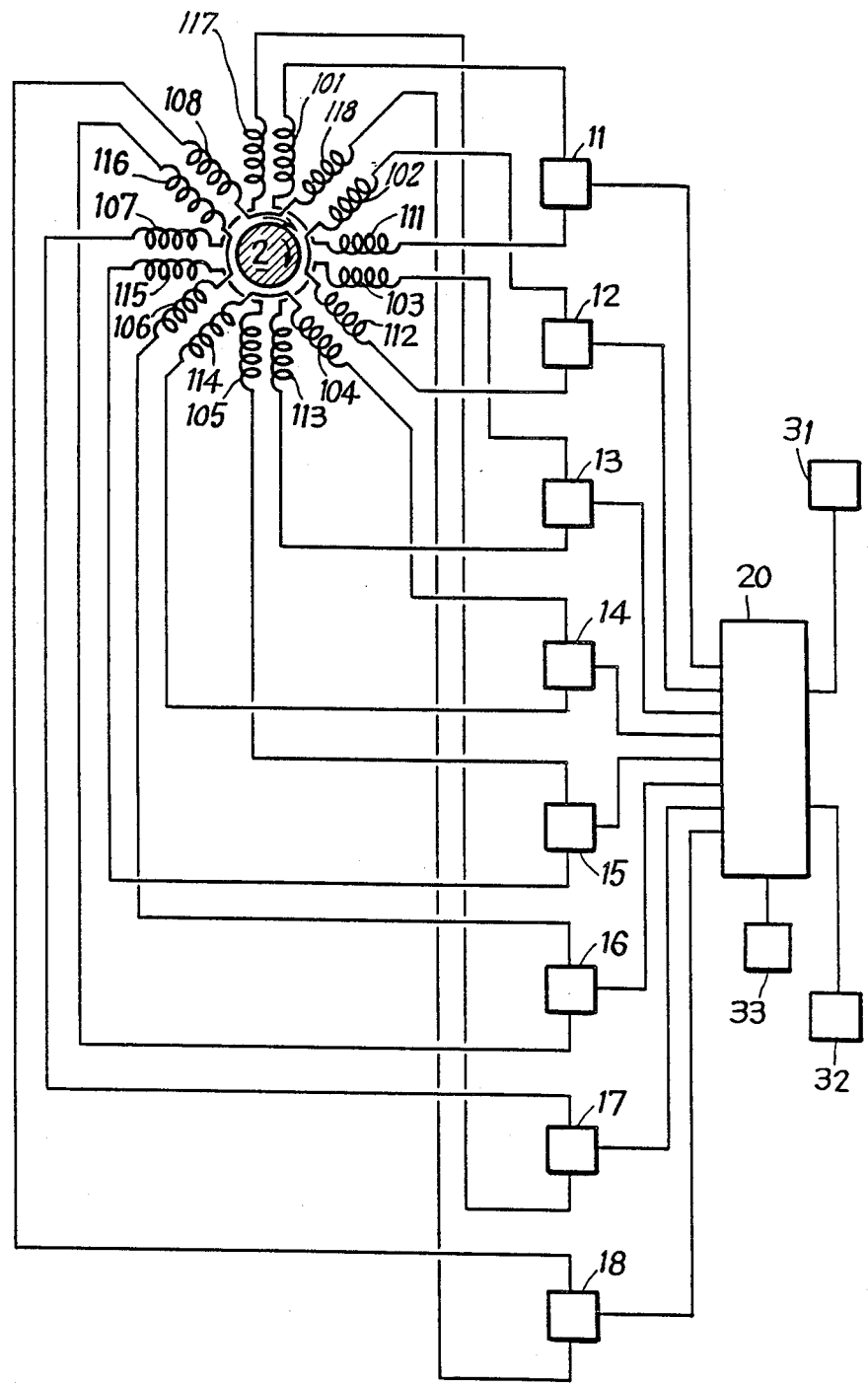

The invention will be more readily understood on reading the following description with reference to the accompanying drawings in which:

FIG. 1 is a diagrammatical view of a known radial magnetic bearing with axial flux, FIG. 2 is a diagrammatical view of a first embodiment of a radial magnetic bearing with radial flux according to the invention.

Figure 4:
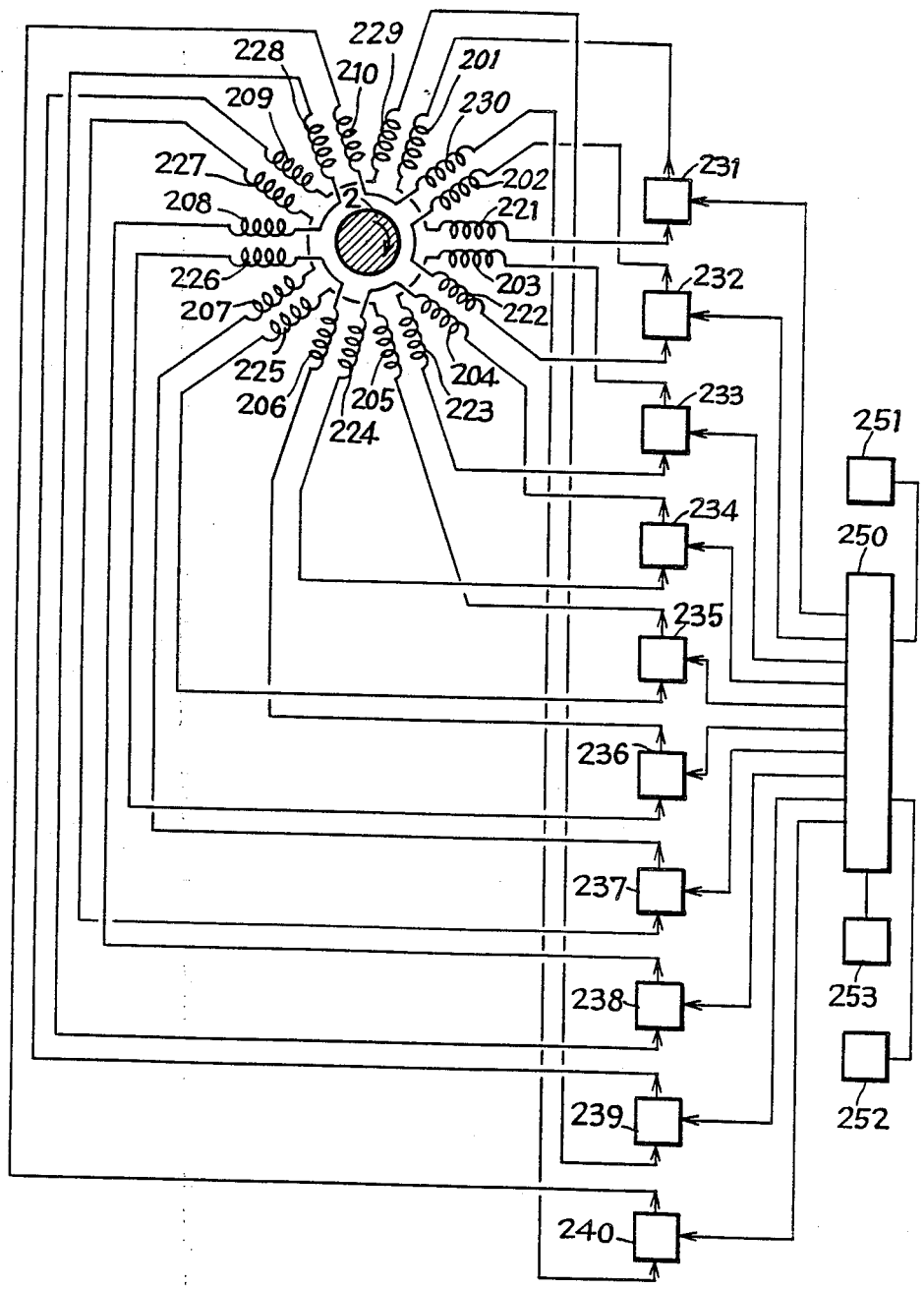
Figure 5A:
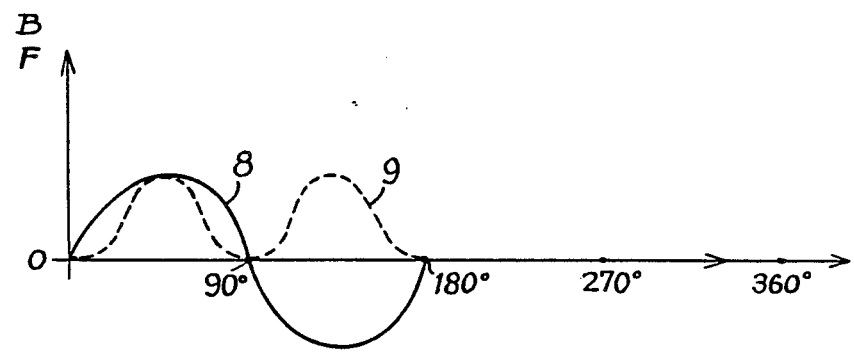
Figure 5B:
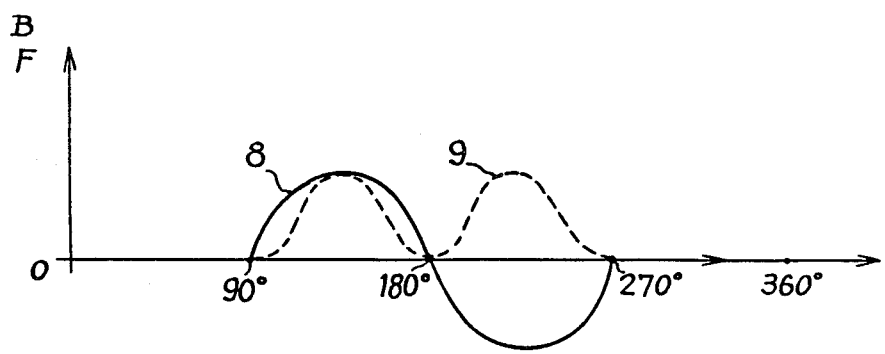
Figure 6:
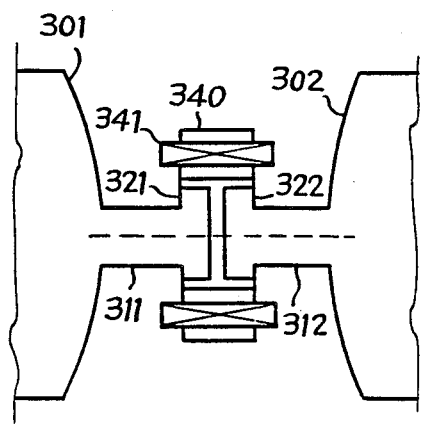

FIG. 3 is a diagrammatical crosssection along a radial plane of the stator of the radial magnetic bearing according to FIG. 2, and FIG. 4 is a diagrammatical view of a second embodiment of the radial magnetic bearing with radial flux according to the invention, FIGS. 5a and 5b show the evolution in time of the magnetic field and of the corresponding force, and FIG. 6 diagrammatically illustrates the application of a magnetic bearing according to the invention to a line of rotor shafts.

Referring first to FIG. 1, this shows a radial magnetic bearing with axial flux comprising U-shaped electromagnets 1, each one presenting pole pieces 3,4 which are symmetrical with respect to a radial plane perpendicular to the axis of rotor 2. Coils 5, 6 fed by energizing currents $I_1$, $I_2$ respectively, are arranged on pole pieces 3,4. This type of bearing creates a magnetic flux along the dotted lines referenced as 7, namely a flux which flows axially to the periphery of the rotor 2 which may be either solid or tubular and requires no laminations. Such a type of magnetic bearing enables the creation of a damping whenever the rotor goes through a critical speed, yet it has certain disadvantages, such as indicated hereinabove and cannot be adapted to all types of rotating machines.

FIGS. 2 to 4 are concerned with radial magnetic bearings with radial flux which, contrary to the bearing of FIG. 1, can be adapted to rotors of large diameter and to rotors turning at high speeds.

FIGS. 2 and 3 show a stator 100 of radial magnetic bearing comprising a fixed armature 120 and a plurality of coils 101 to 108, 111 to 118. For the sake of clarity, in FIG. 2, as also in the variant shown in FIG. 4, only the electromagnetic coils have been shown symbolically.

As shown in FIGS. 2 and 3, eight pairs of coils 101, 111;102, 112; . . . 108,118 are distributed at regular intervals on the periphery of the fixed armature 120. The first pair of coils 101 and 111 comprises a first winding, the second pair of coils 102 and 112 comprises a second winding, the third pair of coils 103 and 113 comprises a third winding, the fourth pair of coils 104 and 114 comprises a fourth winding, the fifth pair of coils 105 and 115 comprises a fifth winding, the sixth pair of coils 106 and 116 comprises a sixth winding, the seventh pair of coils 107 and 117 comprises a seventh winding, and the eighth pair of coils 108 and 118 comprises an eighth winding. Each pair of coils 101, 111; . . . 108, 118 constituting oppositely energized portions of a winding is supplied with the same current from its respective amplifiers 11,–18 supplying a direct current of which the flowing direction is constant. For every winding having a pair of coils, the first coil 101, . . . 108 is fed by an electric current flowing in a first direction and the second coil 111, . . . 118 is fed by the same electric current flowing in the reverse direction to the first direction. For each winding 101,111; . . . 108,118, the second coil 111, . . . 118 is angularly shifted by 90° with respect to the first coil 101, . . . 108.

Owing to a circuit 33 permitting to perform a switching operation inside the servo-control circuit 20 supplying the electromagnetic windings, said servo-control circuit 20 is able to feed in succession one after another, the different pairs of coils 101,111; 102,112; . . . 108,118 which are arranged in succession on the periphery of the stator 100 and successively come opposite the same area of the rotor 2 when the latter rotates. Said circuit 20 thus feeds one by one and successively in that order, amplifiers 11, 12, . . . 18, provided that the rotor 2 rotates in the direction of the arrow shown in FIG. 2.

The servo-control circuit 20 has a conventional structure and enables the adjustment of the value of the current applied to the stator electromagnetic windings as a function of the values of the signals delivered by the detectors 31, 32 of the radial position of the rotor 2 which sense the displacements of said rotor in two orthogonal directions inside a radial plane.

The circuit 33 permits the switching of the supply of the different amplifiers 11, 12, . . . 18 and comprises detection means to detect the rotation speed of rotor 2, in order to enable the synchronization of the feeding operation of the different amplifiers 11, . . . 18 with the rotation of the rotor. Each pair of coils 101, 111;102,112; . . . 108,118 exerts on the rotor a resultant action which, when considered with respect to the stator, is shifted by $2\pi/n$ with respect to the action of the precedingly excited pair of coils, n being the total number of pairs of coils distributed over the stator. Switching pulses can thus be produced as a function of the rotation of the rotor 2, from signals delivered by the speed detection member every time the rotor has covered an angle of $2\pi/n$. The location of the pairs of coils of the stator being well defined with respect to the detectors of the radial position of the rotor 31, 32, each amplifier 11, . . . 18 successively fed by the servo-control circuit 20 as a function of the production of the switching pulses may exert on the rotor a suitable drawing action as a function of the signals delivered by detectors 31, 32, in order to tend to keep the rotor in a preset balancing position.

For ready mounting purposes, the first coil 101, . . . 108 of a given winding is superposed to the second coil 117, . . . 116 of the winding located just before the one last supplied. Moreover, as can be seen in FIG. 2, the different first coils 101, . . . 108 of successive windings are regularly distributed at a 45° angular distance from one another. Likewise, the various second coils 111, . . . 118 of successive windings are angularly spaced apart by 45° from one another in a regular pattern. It will be further noted that the first coil 101, . . . 108 of every winding is inserted between the first and second coils 108,118; . . . 107,117 of the winding fed immediately before and is situated angularly half-way therebetween.

The different coils are all identical and the amplifiers 11 to 18 also have identical characteristics. This guarantees the production of a rotating sinusoidal magnetic field with radial flux which follows the movements of the rotor 2. The latter therefore does not see any substantial variations of the magnetic field over one revolution. This enables the use of a solid rotor while ensuring an effective damping when going through critical frequencies.

For the sake of comprehension, the radial magnetic flux $\phi_o$ circulating in the armature 120 of the rotor 2 and the stator 100 of the bearing at a moment $t_o$ during which the coils 101,111 of the first winding are supplied from amplifier 11 whereas none of the other coils receives any current, has been shown in broken lines in FIG. 3. Said Figure also illustrates in dotted lines the radial magnetic flux $\phi_1$ circulating in the armature 120 of the rotor 2 and the stator 100 of the bearing at a moment $t_1$ corresponding to a 45° rotation of the rotor and during which the coils 102, 112 of the second winding are supplied from amplifier 12 whereas all the other coils are inoperative and receive no current. The resultant force $F_o$ exerted on the rotor at time $t_o$ and due to the flux $\phi_o$ created by coils 101,111 and the resultant force $F_1$ exerted on the rotor at time $t_1$ and due to flux $\phi_1$; created by coils 102, 112 are represented by arrows in FIG. 3. It is clear that the resultant force exerted on the rotor follows the rotation thereof, this really tending to create a damping effect.

FIG. 5a and 5b respectively represent at times $t_o$ and $t_2$ the shape of the magnetic induction B (curve 8 in block lines) and that of the force F due to the magnetic field and exerted on the rotor (curve 9 in broken lines), as a function of the angular position with respect to an origin situated at the level of the first coil 101. It is noted that the shape of the magnetic induction B is sinusoidal whereas the force F, proportional to the square of the magnetic induction B, always retain the same sign. The difference between time $t_2$, and time $t_1$ corresponds to a 90° rotation of the rotor 2 with respect to the position that it occupied at time $t_1$. FIG. 5b thus corresponds to a time when the coils 103 and 113 are supplied from amplifier 13 whereas FIG. 5a corresponds to time $t_1$ when coils 101 and 111 are supplied from amplifier 11.

Because of the overlapping of several pairs of coils 101,111; 102,112; 103,113; . . . 108,118, coil 102 for example being inserted between coils 101 and 103, and because of the successive supply from the different amplifiers 11, 12, . . . 18, it is then possible to create a field which rotates synchronously with the rotor 2, provided that an information concerning the rotation speed of the rotor be supplied to the servo-control circuit 20 by the circuit 33 for controlling the successive switching of the different amplifiers 11 to 18. The created magnetic field is very sinusoidal in shape when eight pairs of coils 101, 111 . . . 108,118 are used as shown in FIG. 2.

The created magnetic field can however be even more sinusoidal in shape if ten pairs of coils 201,221; 202,222; . . . 210,230 are used in association with ten amplifiers 231 to 240, as shown in FIG. 4. With this particular type of embodiment, the fluctuations of the magnetic field inside the rotor are considerably reduced, this permitting both the use of a single solid rotor and the creation of a damping force, this allowing for going through the critical speeds without problems. In FIG. 4, the detectors 251, 252 and circuits 250, 253 respectively correspond to the elements referenced as 31, 32 and 20,33 in FIG. 2. Likewise, the amplifiers 231 to 240 can show characteristics similar to those of amplifiers 11 to 18. Finally, as in the case of FIG. 2, the coils 201, 221; 202,222, . . . 210,230 are regularly distributed on the periphery of the stator, two successive coils 201, 202 or 221,222 being shifted by about 36° and coils are overlapping, coil 202, for example, being inserted between coils 201 and 221. To facilitate mounting, the second coils 221, 222, . . . 230 of the pairs of coils are also placed in the same notches of stator as the first coils 203, 204, . . . 202 of different pairs of coils, with regular shifting.

FIG. 6 shows an example of application of the invention to heavy duty machines presenting several successive sections 301, 302 with shafts 311,312 with a free end portion 321, 322 of larger cross-section. The present invention makes it possible to place directly around the solid end portions 321, 322 a stator 340 equipped with electromagnetic coils 341, produced as described hereinabove, with, for example eight or ten pairs of coils supplied in sequence. This contributes to the production of an efficient magnetic bearing which constitutes an active damping means useful in particular for passing through critical speeds. It will be noted that the radial bearing according to the invention avoids the necessity of having laminations on the ends of shaft 311, 312, and can therefore be applied, whatever the diameter or rotation speed of the shaft. The location on the end portions 321, 322 of increased cross-sections permits for example a production on existing machines where the free space for fitting a bearing or damper is limited.

What we claim is:

1. Active radial magnetic bearing comprising a stator composed of an armature and electromagnetic coils, a bearing rotor placed opposite the stator, detectors for detecting the radial position of the rotor with respect to the stator, and servo-control circuits for adjusting the current going through the electromagnetic coils according to the value of the signals delivered by said position detectors, wherein the bearing rotor is solid, without lamination and the electromagnetic coils are so energized as to create a rotating sinusoidal magnetic field with radial flux which substantially follows the rotation of the rotor, the electromagnetic coils comprising a plurality of windings distributed over the periphery of the stator and energized in succession one after another from the servo-control circuits each of said windings supplied in succession includes a first coil energized to create a magnetic field in a first direction with respect to said rotor and a second coil energized to create a magnetic field in the opposite direction with respect to said rotor, said second coil being shifted angularly with respect to the first coil and connected in series with the first coil.

2. Magnetic bearing as claimed in claim 1, wherein each pair of coils constituting a winding is supplied from its own D.C. amplifier with a constant current flowing direction.

3. Magnetic bearing as claimed in claim 1, wherein the coils of different windings are superposed.

4. Magnetic bearing as claimed in claim 3, wherein the first coil of one particular winding is superposed to the second coil of the winding supplied second to last in sequence before the one particular winding.

5. Magnetic bearing as claimed in claim 3, wherein the first coil in every winding is disposed between the first and second coils of the winding supplied immediately before.

6. Magnetic bearing as claimed in claim 2, wherein the coils are regularly distributed on the periphery of the stator.

7. Magnetic bearing as claimed in claim 2, wherein all the coils are identical to one another and all the amplifiers are also identical to one another.

8. Magnetic bearing as claimed in claim 1, wherein said bearing comprises at least three windings, each one comprising a pair of coils and being supplied from its own amplifier.

9. Magnetic bearing as claimed in claim 1, wherein said bearing comprises eight windings, each winding being comprised of one pair of coils supplied from its own amplifier.

10. Magnetic bearing as claimed in claim 1, wherein said bearing comprises ten windings, each winding comprising one pair of coils, supplied from its own amplifier.

11. Magnetic bearing as claimed in claim 9, wherein said first and second coils of every winding are shifted by 90° with respect to one another.

12. Magnetic bearing as claimed in claim 1, wherein said bearing is mounted on an end of a shaft having increased diameter.

13. The active radial magnetic bearing of claim 1 wherein said bearing rotor comprises at least a portion of a rotary shaft.

14. An active radial magnetic bearing comprising:
a rotor;
a stator including a plurality of electromagnetic coils substantially surrounding said rotor;
a radial position detector for detecting the radial position of said rotor within said stator;
a rotational speed detector for determining the rotational speed of said rotor; and
a servo-control circuits for providing signals to said plurality of electromagnetic coils in response to the signals from said radial position detector and said rotational speed detector to provide a rotating magnetic field upon and synchronous with said rotor, wherein said rotor is selectively radially positioned within said stator according to said rotating magnetic field the electromagnetic coils including a plurality of windings distributed over the periphery of the stator and energized in succession one after another from the servo-control circuits, each of said windings supplied in succession includes a first coil energized to create a magnetic field in a first direction with respect to said rotor and a second coil energized to create a magnetic field in the opposite direction with respect to said rotor, said second coil being shifted angularly with respect to the first coil and connected in series with the first coil.

15. An active radial magnetic bearing comprising a solid rotor without lamination, a stator including a plurality of electromagnetic coils substantially surrounding said rotor, radial position detectors for detecting the radial position of said rotor within said stator, a rotational speed detector for determining the rotational speed of said rotor and a servo-control circuit for providing signals to said plurality of electromagnetic coils in response to the signals from said radial position detectors and said rotational speed detector, wherein said electromagnetic coils are arranged to provide a plurality of windings said plurality of windings being at least equal to three, each winding comprising, mounted in series, a first coil supplied in a first direction and a second coil supplied in the opposite direction to constitute a pair of angularly shifted coils supplied from a respective D.C. amplifier with a constant current flowing direction, and wherein the plurality of windings are energized in succession one after another through their respective D.C. amplifiers from the servo-control circuit in synchronization with the rotor rotation to provide a sinusoidal rotating magnetic field upon said rotor which exerts a radial force upon said rotor and rotates with said rotor, to maintain said rotor radially within said plurality of electromagnetic coils.

16. A bearing as claimed in claim 15, wherein coils of different windings are superposed.

17. A bearing as claimed in claim 16, wherein the first coil of each winding is superposed to the second coil of the winding supplied before the winding in question.

18. A bearing as claimed in claim 17, wherein the first coil of each winding is located along the stator between the first and second coils of the winding supplied immediately before.

19. A bearing as claimed in claim 15, wherein said plurality of windings comprises eight windings.

20. A bearing as claimed in claim 15 wherein said plurality of windings comprises ten windings.

21. A bearing as claimed in claim 19, wherein said first and second coils of each winding are shifted by 90° with respect to one another.

22. A bearing as claimed in claim 15, wherein said bearing is mounted on an end of a shaft of large diameter.

23. A bearing as claimed in claim 15, wherein all the coils are identical to one another.

* * * * *

UNITED STATES PATENT AND TRADEMARK OFFICE
CERTIFICATE OF CORRECTION

PATENT NO. : 4,866,318
DATED : September 12, 1989
INVENTOR(S) : Helmut Habermann, Maurice Brunet, Alain Gerbier It is certified that error appears in the above-identified patent and that said Letters Patent is hereby corrected as shown below:

In Column 2, line 52, "invention." should read --invention,--.

In Column 2, line 53, "crossection" should read --cross-section--.

In Column 3, line 17, "111 to 118" should read --111 to 118, mounted in notches 121 of a fixed armature 120.--

In Column 8, line 15, "claim 17" should read --claim 16--.

Signed and Sealed this

Second Day of June, 1992

Attest:

DOUGLAS B. COMER

*Attesting Officer*      *Acting Commissioner of Patents and Trademarks*